(No Model.)
W. W. NEWCOMB.
COFFEE POT.
No. 362,105. Patented May 3, 1887.
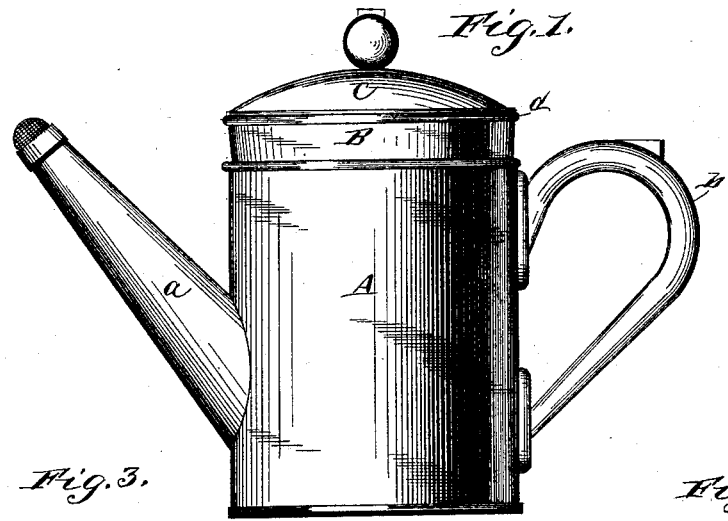
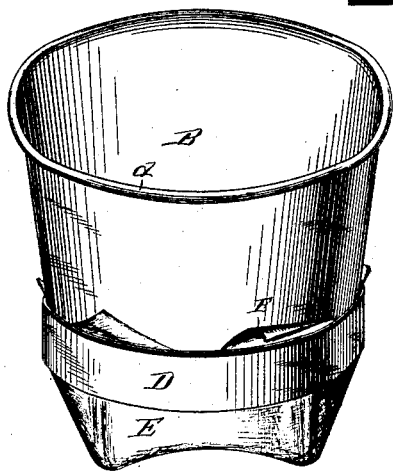
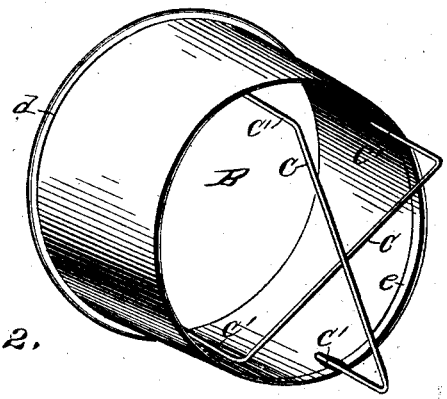
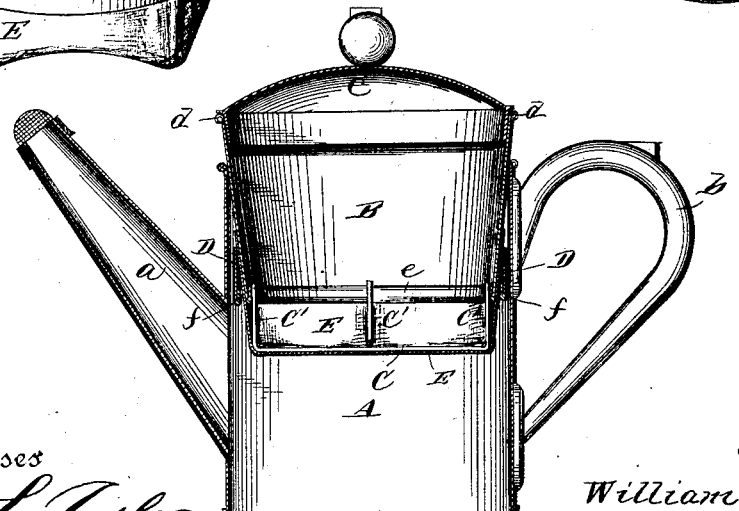
Witnesses
Chas. L. Taylor
E. G. Siggers
Inventor
William W. Newcomb
By his Attorneys

United States Patent Office.

WILLIAM W. NEWCOMB, OF BRADFORDSVILLE, KENTUCKY.

COFFEE-POT.

SPECIFICATION forming part of Letters Patent No. 362,105, dated May 3, 1887.

Application filed November 30, 1886. Serial No. 220,286. (No model.)

*To all whom it may concern:*

Be it known that I, WILLIAM W. NEWCOMB, a citizen of the United States, residing at Bradfordsville, in the county of Marion and State of Kentucky, have invented a new and useful Improvement in Coffee-Pots, of which the following is a specification.

My invention is an improvement in coffee or tea pots; and it consists in novel means for attaching the straining cloth or sack to the receptacle for holding the coffee or tea, as hereinafter fully described, and more particularly pointed out in the claim.

In the drawings hereto annexed, and forming a part of this specification, Figure 1 is a side elevation of my improved coffee or tea pot. Fig. 2 is a central vertical section of the same. Fig. 3 is a perspective view of the receptacle detached; and Fig. 4 is also a perspective view of the receptacle, but taken from another point.

The same letters of reference have been applied to corresponding parts in the several figures.

A represents a coffee or tea pot of any preferred or desired construction, the same having a spout, $a$, handle $b$, and lid or cover $c$. Within the mouth of the pot A the receptacle B is adapted to be fitted. This receptacle is flaring from bottom to top, and at its upper edge is of the same diameter as the mouth of the pot, whereby the cover may be removed from the pot and fitted upon the mouth of the receptacle, or will fit upon the mouth of the pot when the receptacle is removed.

The receptacle B is composed of tin, zinc, sheet-iron, or any suitable metal, and is provided around its bottom and top with beads $d\ e$. Wires C, preferably two in number, as shown, extend across the bottom of the receptacle, and at their outer ends are provided with turned-up portions C', which latter are soldered or otherwise secured to the inside of the receptacle in such a manner that the bodies of the wires shall lie in a plane below that of the bottom of the receptacle. The wires cross each other at or near the center of the pot, and may or may not be fastened together at that point, as desired.

D is a metal ring provided with a bead, $f$, at its lower edge, the diameter of said ring being slightly larger than that of the bottom of the receptacle, whereby it may be passed upward over the outside of the latter, and will become wedged thereon at a short distance from the lower end thereof.

E represents a cloth of suitably coarse mesh to properly filter or strain the coffee in the operation of making the same, and this cloth is secured to the bottom of the receptacle in the following manner: The receptacle being removed and inverted, the cloth is placed over the wires C and falls against the sides of the receptacle. The ring D is then passed over the turned-up portions C' of the wires, upon the outside of the cloth, and forced downward upon the receptacle until it is securely wedged thereon, whereby the cloth is firmly held in place. The receptacle with the cloth thereon may then be inverted, filled with coffee to the desired amount, and placed within the pot, the cover fitting into the top thereof, and preventing the egress of fumes and coffee in a condensed condition.

It will be understood that in clamping the cloth upon the receptacle the beaded edge of the ring D is placed uppermost, by which means the cloth is uninjured.

I am aware of the existence of Letters Patent No. 308,015, granted to John Tobin, November 11, 1884, and No. 343,812, granted to R. L. Gore, June 15, 1886. The former of these patents shows a coffee-receptacle and a filter attachment for the same. The filter attachment consists of two wires crossed at right angles and having their ends extended upward into the receptacle and fastened to a carrying-ring. In operating this device a straining-cloth is placed across the upper end of the receptacle, and the crossed wires are then pushed downward into the receptacle, forcing the straining-cloth before them. The downward progress of the device is stopped and the straining-cloth held in the receptacle by the ring fastened to the upper ends of the wires, binding against it and the receptacle. The middle portions of the crossed wires are formed approximately in a semicircle, the result of which is that the coffee-grounds and other sediment collect at the center of the bottom of the filter, and the weight thereof is unevenly distributed, causing the straining-cloth to sag, which destroys its efficiency. Another defect of this device is that the manner of securing and placing the straining-cloth within the receptacle soon wears away the central portion of the straining-cloth, thereby necessitating the provision of a new one.

Patent No. 343,812 shows a receptacle to the lower end of which a wire frame is secured. This wire frame consists of two wires bent into the form of a semicircle, and having their ends bent up and secured to the inside of the receptacle. These wires are placed so as to form a complete circle. The straining-cloth is placed over the wires, and secured by a ring slipped over the same and the lower end of the receptacle. In this device sides, or vertical portion, of the straining-cloth are without support, except at two diametrically-opposite points, the consequence of which is that the cloth is apt to sag, thereby lessening its effectiveness. These constructions are foreign to my invention, and I make no claim thereto. By the use of my device the straining-cloth is held against slipping, and the weight and strain thereon are evenly distributed. My construction also is such that the straining-cloth can be quickly applied without requiring any nicety of adjustment, or without putting any undue strain thereon.

Having thus described my invention, what I claim as new, and desire to secure by Letters Patent, is—

The herein described and shown improvement in coffee-pots, comprising the pot, the coffee-receptacle, the crossed wires C, arranged at right angles to each other and having their ends bent up at right angles and fixedly secured to the lower end of the receptacle upon the inner face of the same, the straining-cloth placed over said crossed wires, and a ring fitted over the cloth and the lower outer end of the receptacle, all arranged and operating substantially as specified.

In testimony that I claim the foregoing as my own I have hereto affixed my signature in presence of two witnesses.

WILLIAM W. NEWCOMB.

Witnesses:
WM. SEVERANCE,
J. A. BOWMAN.